(12) United States Patent
Shoji et al.

(10) Patent No.: US 9,334,122 B2
(45) Date of Patent: May 10, 2016

(54) HIGH-SPEED CONVEYOR BELT COMPRISING WOVEN FABRIC AND APPARATUS EMPLOYING SAME

(71) Applicants: SANWA TECHNO Co., Ltd., Kobe-shi Hyogo-ku (JP); Susumu Shoji, Kobe-shi Hyogo-ken (JP)

(72) Inventors: Susumu Shoji, Kobe (JP); Kazuro Fukui, Kobe (JP)

(73) Assignee: SANWA TECHNO Co., Ltd., Kobe-shi (JP)

(*) Notice: Subject to any disclaimer, the term of this patent is extended or adjusted under 35 U.S.C. 154(b) by 183 days.

(21) Appl. No.: 14/019,498

(22) Filed: Sep. 5, 2013

(65) Prior Publication Data

US 2014/0001014 A1  Jan. 2, 2014

Related U.S. Application Data

(63) Continuation-in-part of application No. PCT/JP2011/055150, filed on Mar. 5, 2011.

(51) Int. Cl.
| | |
|---|---|
| *B65G 15/34* | (2006.01) |
| *B65G 15/54* | (2006.01) |
| *B65G 15/30* | (2006.01) |
| *B65G 21/20* | (2006.01) |
| *B65H 5/22* | (2006.01) |

(52) U.S. Cl.
CPC ............ *B65G 15/54* (2013.01); *B65G 15/30* (2013.01); *B65G 21/2036* (2013.01); *B65H 5/224* (2013.01); *B65H 2401/141* (2013.01); *B65H 2404/271* (2013.01); *B65H 2404/281* (2013.01)

(58) Field of Classification Search
CPC ........................................................ B65G 15/34
USPC ................................... 198/689.1, 846, 844.1
See application file for complete search history.

(56) References Cited

U.S. PATENT DOCUMENTS

| | | | | |
|---|---|---|---|---|
| 4,767,389 | A * | 8/1988 | Habegger et al. ............. | 474/266 |
| 5,158,171 | A * | 10/1992 | Graff ............................ | 198/848 |
| 5,227,224 | A * | 7/1993 | Ishikawa et al. .............. | 428/212 |
| 7,320,947 | B2 * | 1/2008 | Child et al. ................... | 442/110 |
| 2003/0079850 | A1 * | 5/2003 | Rougvie ....................... | 162/902 |

* cited by examiner

*Primary Examiner* — Gene Crawford
*Assistant Examiner* — Lester Rushin
(74) *Attorney, Agent, or Firm* — JTT Patent Services, LLC; Gerald T. Peters

(57) ABSTRACT

A conveyor belt comprises woven fabric having a mesh structure which imparts the belt with air permeability permitting suction of air therethrough. In one embodiment, the woven fabric is such that a portion made in plain weave in a low-density weave pattern of prescribed width in which at least one warp yarn and at least one weft yarn are woven together alternates with a portion made in satin weave in a high-density weave pattern of prescribed width in which five to twelve warp yarns and the same at least one warp yarn as in the low-density weave pattern are woven together. This alternation of low-density weave pattern(s) and high-density weave pattern(s) may create stripe(s) disposed in the conveying direction of the belt. Portion(s) made in satin weave may be disposed at one or both side end(s) of the belt.

10 Claims, 8 Drawing Sheets

(a) Present invention (striped mesh belt)

(b) Conventional item (rubber belt + machining for creation of holes)

(a)   (b)

(a)   (b)

(a) (b)

(a) (b)

(a)  (b)

(a)  (b)

(a)

(b)

Direction of vibrations

HIGH-SPEED CONVEYOR BELT COMPRISING WOVEN FABRIC AND APPARATUS EMPLOYING SAME

CROSS-REFERENCE TO RELATED APPLICATION, PRIORITY CLAIM, AND INCORPORATION BY REFERENCE

This application is a continuation-in-part of and claims benefit under 35 USC 120 and 365(c) to copending International Application No PCT/JP2011/055150, entitled "Fabric-Based High-Speed Conveyance Belt and Apparatus Using Same", filed 5 Mar. 2011, the content of which is incorporated herein in its entirety by reference.

FIELD OF THE INVENTION

The present invention relates to a conveyor belt, and in particular relates to a conveyor belt comprising woven fabric in which the belt material is formed from fibers, and to a conveyor apparatus employing such a conveyor belt.

BACKGROUND

It is generally the case, when using a conveyor belt to convey any of a variety of medicinal pills or other such small separate objects or any of a variety of separate sheets of sheet-like papers at high speed, that the paper or small object, being lightweight, is while being conveyed apt to float above the conveyor belt due to air resistance, which can prevent it from being conveyed in its proper orientation.

The present invention relates to a conveyor belt that conveys a lightweight sheet-like object or lightweight pill or granule-like object and/or lightweight clumpy object, the object being of such size as to allow it to be placed within the width of the belt, and relates to a conveyor apparatus employing such conveyor belt.

The present invention therefore relates to a conveyor belt having a structure such as will, when using a conveyor belt to convey paper for a copy machine, i.e., electrophotographic apparatus, or medicinal pills or other such small objects which are lightweight individual objects at high speed, prevent such papers or medicinal pills or other such small objects which are lightweight individual objects from floating above the conveyor belt while being conveyed and allow them to be conveyed in their proper orientations, and in particular to a conveyor belt comprising woven fabric in which the belt material is formed from fibers, and relates to a conveyor apparatus employing such a conveyor belt.

Conveyor belts—also called transport belts—which convey objects have typically been used most regularly at factories and the like where mass production is taking place. Such belts are made of rubber, woven fabric, wire mesh, steel plate, or other material. Such belts are suspended in loop-like fashion between belt pulleys provided at either end thereof, an object which is to be conveyed being conveyed when placed on such a belt due to motion of the belt. And such conveyor belts for conveying objects to be conveyed are used not only at the aforesaid factories and the like where mass production is taking place, but are incorporated in treatment apparatuses and/or processing apparatuses that treat and/or process individual objects, being employed within such apparatuses to convey objects to be treated and/or objects to be processed. Examples of such processing apparatuses include, for example, conveyor belts that convey medicinal pills, conveyor belts that convey copier paper for electrophotographic apparatuses within the apparatus, and so forth.

Some conveyor belts employ base material comprising fabric which has been woven into a mesh structure that has been made into a belt for conveying any of a variety of objects. Examples of such conveyor belts comprising fabric woven into a mesh structure will be described in turn below.

First, proposed as a belt having a mesh structure is a conveyor belt formed by causing a sturdy fabric which is a separate piece of cloth and which has a structure that is other than mesh structure to be stitched thereto in overcast fashion along a fixed width at the ends on either side of the belt.

Second, a conveyor belt is proposed which comprises a mesh belt woven from yarn comprising synthetic fibers and which is formed by causing reinforcing synthetic fiber fabric to cover and fuse with the ends on either side of this mesh belt.

Third, a conveyor belt has been developed which has a belt core that is woven in mesh-like fashion from glass fibers, the belt being such that a plurality of seal strips formed from resin or flexible material are integrally provided in row-like fashion in the conveying direction, being formed so as to protrude from the inner and outer surfaces thereof, and the belt side ends are moreover reinforced with fabric or other such reinforcing material in such fashion as to straddle the belt core.

Fourth, a conveyor belt is a filter mesh belt formed from a mesh portion formed between portions formed at either side in the long direction and a plurality of reinforcing portions arranged so as to cross the mesh portion, these side portions and these reinforcing portions being woven more tightly than the mesh portion and being imparted with more rigidity than the mesh portion. Hot-melt fibers are moreover woven into the side portions and reinforcing portions, application of heat treatment thereto causing these to be molded together in integral fashion, this integrally molded belt being what is proposed.

Fifth, a conveyor belt for a dryer has been proposed which is an air-permeable belt for carrying out cooling and/or drying at normal pressure of raw materials while blowing hot or cold air thereonto, this conveyor belt being used in an apparatus in which a blower box formed by arranging a perforated plate at the top surface is brought into intimate contact with the bottom surface of a conveyor belt comprising a mesh belt, hot or cold air being blown from the blower box so as to dry or cool the raw materials atop the mesh belt.

Sixth, proposed is a belt comprising a 1-mm to 2-mm warp parallel to the mesh belt conveying direction and comprising a 0.1-mm to 0.5-mm weft perpendicular to this warp, the mesh belt which has a mesh opening ratio of 15% to 40% being coated or impregnated with silicone rubber for formation thereof.

Seventh, proposed is a belt which comprises a solid belt, holes for air permeability being formed in this solid belt, irregular groove shapes parallel to the belt conveying direction being present, height of the irregular groove shapes being not less than 0.1 mm, the irregular shapes repeating with a periodicity that is not less than 1 mm, height of unevenness in paper which is the object to be conveyed being reduced by suction means.

Eighth, proposed is a belt which is a mesh belt wherein a guide rib member is arranged on a back surface at an edge of the belt, engagement of this guide rib member with a guide groove formed therebelow preventing lateral displacement in the axial direction.

Ninth, proposed is a transport belt wherein an air-permeable transport belt comprising a mesh belt is formed from yarn comprising fiber strands of twisted yarn in a vertical direction extending in the transport direction, and cross yarn extending in such fashion as to cross the transport direction and intersecting the yarn comprising fiber strands in the vertical direction, the gap between warp yarns in the vertical direction being larger than the gap between cross yarns in the horizontal direction.

Tenth, proposed is a belt which is a mesh formed from cloth made in plain weave wherein the mesh pitch is set so as to be between 100 μm and 170 μm, the yarns from which the textile is made employ more solid yarn than twisted, i.e., twined, yarn, and the difference in height between warp yarns (vertical strands) and weft yarns (horizontal strands) where fibers intersect is set so as to be 20 μm to 100 μm.

However, the foregoing proposed conveyor belts which comprise mesh belts have the problem of fraying at the belt side ends. One way to address this fraying problem is to implement reinforcement processing at the belt side ends.

To improve strength and endurance, a mesh belt may be employed in which warp yarns are made thicker than weft yarns, diameter of warp yarns being made 1 mm to 2 mm, with diameter of weft yarns being made 0.1 mm to 0.5 mm.

To prevent meandering due to lateral displacement of the conveyor belt, a guide rib member for preventing lateral displacement may be arranged at the side ends of the mesh belt to carry out prevention of lateral displacement.

But because a mesh constituted from plain weave may require strategies including those for reinforcing strength and preventing lateral displacement and fraying at the side ends of the conveyor belt, e.g., strategies involving reinforcing materials and secondary treatment are required to prevent fraying, this can result in increased cost.

Moreover, if thickness of the warp yarn in the mesh is increased to 1 mm to 2 mm, this may cause it to be of insufficient flexibility for use as a conveyor belt.

As described above, with a conveyor belt having mesh construction which comprises woven fabric made in plain weave, to prevent lateral displacement due to meandering during conveying by the belt and to prevent fraying occurring at the belt side ends due to the fact that the entirety is of mesh construction, and because there are no steps at the belt surface, there has been the problem of secondary processing carried out to provide the belt side ends with guide members; and in addition, because strength is insufficient when the entire surface of the conveyor belt is in the form of a mesh belt, there has been the problem that extremely thick yarn was used to form the mesh belt so as to increase the strength thereof. Furthermore, where rubber is used as material for a conveyor belt in the form of a mesh belt, there has been the problem that machining was necessary to cause the belt to be provided with holes so that the belt comprising rubber could be made to have air permeability, which has caused increase in cost.

Problems to be solved by the present invention include elimination of problems such as the foregoing fraying of yarn at the side ends of the conveyor belt, meandering due to lateral displacement of the belt, need to install guide members at belt side ends, need to form the belt with thick yarn to compensate for lack of strength possessed by a mesh belt, increase in cost due to use of rubber material, and so forth, by providing a conveyor belt having mesh construction comprising woven fabric for permitting suction of air from below the belt and causing an object to be conveyed which is placed thereon to be conveyed at high speed, as well as a conveyor apparatus employing such a conveyor belt.

SUMMARY OF INVENTION

In accordance with one embodiment of the present invention, a conveyor belt may comprise woven fabric having at least one weft yarn and at least one warp yarn.

The at least one weft yarn may be in a direction perpendicular to a conveying direction of the belt and may be formed from a single weft yarn type. The at least one warp yarn may be in the conveying direction of the belt and may be formed from at least two warp yarn types.

The at least two warp yarn types may include a first warp yarn type which makes up a low-density weave pattern and a second warp yarn type which makes up a high-density weave pattern.

A low-density region and a high-density region may be formed in alternating fashion in the width direction of the belt from this one type of weft yarn and these two types of warp yarn.

The low-density region may be formed from a lattice-like mesh having a pattern made in at least one species selected from among the group consisting of plain weave and twill weave.

The high-density region may be formed from a pattern made in satin weave.

The respective regions may be of prescribed widths and form a woven fabric comprising stripes.

At least a portion of the high-density region may be arranged at a belt side end.

The conveyor belt may be an endless belt.

In the low-density region, the at least one weft yarn may comprise monofilament yarn. Alternatively or additionally, in the low-density region, the at least one warp yarn may comprise monofilament yarn.

The at least one warp yarn may be sparse in the low-density region. The at least one warp yarn may be crowded in the high-density region.

The width of the low-density region and the width of the high-density region may respectively be such as to permit formation of gaps causing an air permeability thereof to be suitable for suction of air therethrough.

In the low-density region, the at least one warp yarn may be woven at low density. Alternatively or additionally, in the low-density region, the at least one weft yarn may comprise monofilament yarn. Alternatively or additionally, in the low-density region, the at least one warp yarn may comprises soft-twist multifilament yarn.

The soft-twist multifilament yarn may be constituted so that it will spread out when woven together with the at least one weft yarn that comprises monofilament yarn. Alternatively or additionally, the low-density multifilament warp yarn may permit formation of gaps causing air permeability suitable for suction of air therethrough.

A thickness of the low-density region may be less than a thickness of the high-density region. This difference in the thickness of the low-density region and the thickness of the high-density region may cause a step to be formed therebetween.

The at least one warp yarn may be woven at low density in the low-density region. The at least one warp yarn may be woven at high density in the high-density region.

The at least one warp yarn woven at low density in the low-density region and/or the at least one warp yarn woven at high density in the high density region may comprise flexible stretch yarn. The flexible stretch yarn may cause the striped woven fabric to have flexibility in a direction of the stripes.

The at least one warp yarn may contain electrically conductive filament yarn at at least one of where the at least one warp yarn is woven at low density in the low-density region and where the at least one warp yarn is woven at high density in the high-density region. Application of a voltage to this electrically conductive filament yarn may cause formation of an electric field which makes it possible to cause a conveyed object to be electrostatically held to the conveyor belt.

The woven fabric may be woven by a needle loom or a shuttle loom.

The woven fabric may comprise monofilament yarn and/or multifilament yarn. The monofilament yarn and/or the multifilament yarn may contain at least one species selected from among the group consisting of metal fiber, natural fiber, artificial fiber, and synthetic fiber. To adjust a gripping force of the conveyor belt and prevent lateral displacement of the at least one warp yarn in a direction of the at least one weft yarn, in correspondence to content of the electrically conductive filament yarn, a coating agent and/or a backing agent formulated to have suitable electrical resistivity may be used to carry out coating treatment and/or backing treatment at at least one location where the at least one warp yarn contains the electrically conductive filament yarn.

In accordance with another embodiment of the present invention, a conveyor apparatus may comprise a conveyor belt as described above and at least one belt pulley on which said conveyor belt is suspended. In such case, the striped woven fabric of the conveyor belt may have gaps causing an air permeability thereof to permit suction of air therethrough as suitable for conveying paper and sheet-like objects or objects of diameter smaller than the belt width which are placed thereon and drawn by suction thereto.

In such a conveyor apparatus, the conveyor belt may have a step between the low-density region and the high-density region.

At least a portion of the high-density region may be arranged at a side end of the conveyor belt.

The conveyor belt may have at least one feature for preventing lateral displacement and meandering of the conveyor belt.

Embodiments of the present invention may be implemented in the context of a conveyor belt that employs suction of air in conveying paper and sheet-like objects or objects of diameter smaller than the belt width which are drawn by suction thereto and caused to be placed thereon. This conveyor belt may be a belt comprising woven fabric, the weft yarn thereof which is in a direction perpendicular to the conveying direction of the belt being formed from a single type of yarn, and the warp yarn thereof which is in the conveying direction of the belt being of two types, these being a warp yarn which makes up a low-density weave pattern and a warp yarn which makes up a high-density weave pattern. A low-density region and a high-density region may be formed in alternating fashion in the width direction of the belt from this one type of weft yarn and these two types of warp yarn, the low-density region being formed from a lattice-like mesh having a pattern made in plain weave or in twill weave, and the high-density region being formed from a pattern made in satin weave. The conveyor belt may be such that the respective regions are of prescribed widths and form a woven fabric (hereinafter "striped woven fabric") comprising banded stripes, a portion made in the aforementioned satin weave being arranged at a belt side end, and in that this banded striped woven fabric is used to constitute an endless belt.

In such case, the striped woven fabric may be formed from weft yarn comprising monofilament yarn and warp yarn comprising monofilament yarn at a portion made in plain weave or in twill weave that forms a lattice-like mesh at a weave pattern in a region having low density. Such a conveyor belt may be such that width at a portion made in a plain weave pattern at a low-density region where warp yarns are sparse and width at a portion made in a satin weave pattern at a high-density region where warp yarns are crowded may be respectively adjusted as desired to form gaps required for air suction.

The striped woven fabric may be such that the warp yarn is warp yarn making up the low-density weave pattern. The weave pattern of the striped woven fabric may be such that a portion made in plain weave or in twill weave comprising a lattice-like mesh is formed from weft yarn comprising monofilament yarn and warp yarn which is made to be soft twist and which comprises multifilament yarn. The multifilament yarn at the warp yarn made to be soft twist at the portion made in plain weave may be constituted so that it will spread out when woven together with a weft yarn that is a monofilament yarn. Gaps which may be required for air suction may be made to be present by virtue of multifilament yarn which is warp yarn. Note that one possible reason why the warp yarn comprising multifilament yarn might be made to be soft twist is to prevent occurrence of raggedness which might otherwise occur as a result of needle rotation where a needle loom is used.

A portion made in plain weave or in twill weave which forms a lattice-like mesh in a region having a weave pattern of low density may be different from a portion made in satin weave having a weave pattern of high density. Thickness of the portion made in plain weave or in twill weave may be less than thickness of the portion made in satin weave. The striped woven fabric which is formed may have a step between the two weave patterns, these two weave patterns being the weave pattern at this low-density region and the weave pattern at this high-density region.

The portion made in plain weave or in twill weave in a region having a weave pattern of low density may comprise warp yarn making up a low-density weave pattern. The portion made in satin weave having a weave pattern of high density may comprise warp yarn making up a weave pattern of high density. Said warp yarn making up the weave pattern of low density and said warp yarn making up the weave pattern of high density may each be formed from flexible stretch yarn. These flexible stretch yarns may be used to form striped woven fabric having flexibility in a direction of the banded stripes.

At least one of the warp yarn making up the weave pattern of low density and the warp yarn making up the weave pattern of high density may be formed from filament yarn having electrical conductivity. Application of a voltage to this filament yarn having electrical conductivity may cause formation of an electric field and may make it possible to cause a conveyed object to be electrostatically held to the conveyor belt. The striped woven fabric may be formed from this warp yarn making up the weave pattern of low density and/or this warp yarn making up the weave pattern of high density.

The striped woven fabric may comprise woven fabric which is woven by a needle loom or a shuttle loom. Such striped woven fabric comprising woven fabric which is woven by a needle loom or a shuttle loom may be used to constitute an endless loop belt.

The striped woven fabric may be such that the monofilament yarn and/or multifilament yarn is metal fiber, natural fiber, artificial fiber, or synthetic fiber. To adjust a gripping force of the conveyor belt and prevent lateral displacement of warp yarn with respect to the weft yarn direction, in correspondence to content of the electrically conductive filament yarn contained within the filament yarn used at the warp yarn making up the high-density weave pattern and/or the warp yarn making up the low-density weave pattern, a coating agent and/or a backing agent formulated to have a desired resistance value may be used to carry out coating treatment and/or backing treatment of this warp yarn making up the high-density weave pattern and/or this warp yarn making up the low-density weave pattern.

A conveyor apparatus employing suction of air may comprise a conveyor belt in which striped woven fabric permitting suction of air therethrough and comprising a portion made in plain weave with low density and a portion made in satin weave with high density having gaps comprising lattice-like mesh at a conveyor belt that conveys paper and sheet-like objects or objects of diameter smaller than the belt width which are drawn by suction thereto and caused to be placed thereon. Such a conveyor apparatus may further comprise belt pulley(s) on which said conveyor belt is suspended.

A tenth means is a conveyor apparatus employing suction of air according to the ninth means characterized in that in addition to plain weave or twill weave having gaps comprising mesh, the conveyor belt has a step between the portion made in plain weave or in twill weave and the portion made in satin weave; a side end of the conveyor belt is formed from this portion made in satin weave; and lateral displacement and/or meandering of the conveyor belt is prevented.

A conveyor belt in accordance with one or more embodiments as described above may be such that striped woven fabric comprising bands in the conveying direction is constituted so as to be striped, which is to say that there is a pattern of bands, which are formed in such fashion that low-density weave patterns at locations made in plain weave and high-density weave patterns at locations made in satin weave are present in alternating fashion, this striped woven fabric having a structure which provides endurance and strength due to the high-density weave pattern at locations made in satin weave. Moreover, in some embodiments it is possible to form, as desired, gaps comprising weft yarn at low density as a result of weaving conditions whereby density of weft yarn is made different and yarn conditions comprising combination of monofilament yarn and multifilament yarn. By causing a plain weave pattern which has a low-density mesh structure to be present between such satin weave patterns, it may be possible to ensure that there will be air permeability as required for suction of air through gaps in the mesh structure and it may be possible to obtain a structure such as will prevent conveyed objects from floating above the belt. Moreover, by employing two types of warp yarns having different diameters, the striped woven fabric may be made to comprise a structure having a step between a region made in plain weave and a region made in satin weave, formation of a ridge of which this step is comprised in some cases mitigating the tendency for wrinkling of the conveyor belt to occur due to the influence of suction of air from the gaps in the mesh, and the step which comprises the ridge in some cases preventing meandering and lateral displacement of the conveyor belt. Moreover, by producing this striped woven fabric by weaving using a needle loom or a shuttle loom, the side ends of a conveyor belt comprising this striped woven fabric may be made to have a construction such as will prevent the yarn from fraying thereat.

Furthermore, by using flexible stretch yarn as the woven warp yarn, it may be possible to form a conveyor belt having flexibility. Moreover, because the conveyor belt may be made from striped woven fabric in which the stripes may be of prescribed pitch, employment of yarn made from electrically conductive filament at portion(s) made in plain weave and/or at portion(s) made in satin weave, by virtue of the fact that stripes are formed with prescribed interval therebetween, may permit the electric field which may be required for electrostatically holding objects to the belt to be easily formed through application of a voltage thereto, as a result of which they may be able to be conveyed at high speed due to the fact that they may be electrostatically held thereto. Moreover, because the conveyor belt may be an endless belt made from striped woven fabric, it may also be possible to use metal wire, i.e., metal filament, as material from which the belt is woven, production thereof through weaving therewithin such metal wire, i.e., metal filament, in some cases making it possible to obtain a conveyor belt which may be capable of being suitably employed where endurance in required in the conveyor belt as well as at locations where ability to shed water may be required thereof.

A conveyor belt comprising locations made in plain weave and locations made in satin weave in accordance with the present invention is thus a conveyor belt that had been unavailable conventionally and that may excel with respect to functionality, manufacturability, economy, and so forth. In addition, by causing this conveyor belt to conform to belt pulleys at a conveyor apparatus, or assembling this conveyor belt thereon so that it conforms to valleys and peaks in steps at belt pulleys, in conformance with steps at the belt, it may be possible to obtain a conveyor apparatus whereby prevention of lateral displacement and/or meandering of the conveyor belt is achieved, as a result of which it may be possible to form a conveyor apparatus that permits reduction in product cost.

Moreover, describing possible advantages of the present invention, not necessarily present in all embodiments within the scope of the present invention, first is that when produced by weaving using a needle loom or a shuttle loom, the side ends of a conveyor belt may be made to have a weave pattern at which fraying of yarn tends not to occur. Second is that because the conveyor belt may be woven fabric made up of combination of locations made in plain weave and locations made in satin weave, it may be possible to cause it to be formed such that strength in the conveying direction is made more robust by virtue of portions made in satin weave at high density. Third is that it may be possible to form, as desired, gaps comprising weft yarn at which density is small as a result of weaving conditions whereby density of weft yarn is made different and yarn conditions comprising combination of monofilament yarn and multifilament yarn. Fourth is that it may be made in weave pattern(s) comprising linear stripes having steps in a direction perpendicular to the conveying direction of the conveyor belt, and it may be possible to use these steps to competently prevent lateral displacement, i.e., meandering, of the conveyor belt. Fifth is that by using the same loom but changing the material of the warp yarn it may be possible to easily manufacture a stretchable conveyor belt. Sixth is that it may be possible for a long conveyor belt to easily be manufactured. Seventh is that where reinforcing members need not be employed, secondary processing involving machining of holes for attachment of reinforcing members may be unnecessary, and so it is may be possible to manufacture a conveyor belt advantageously from the standpoint of cost.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

Figure 2:
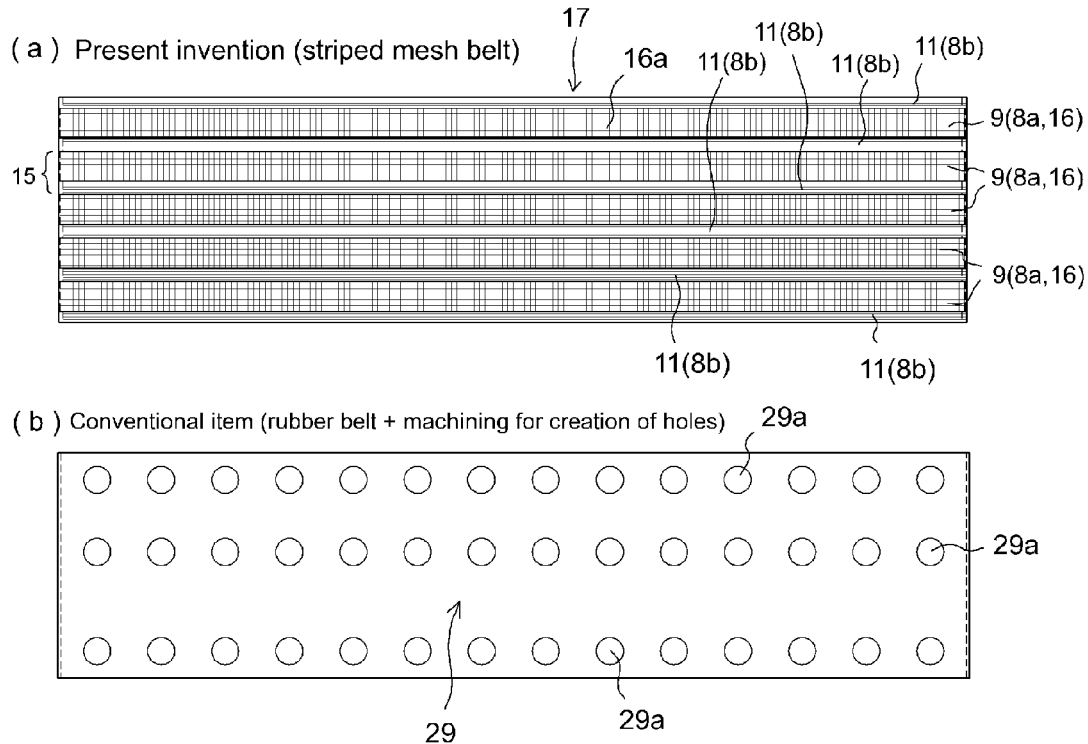

At FIG. 2, (a) is a plan view of a conveyor belt in accordance with the present invention; (b) is a plan view of a conventional conveyor belt comprising a rubber belt at which machining has been carried out for creation of holes.

Figure 3:
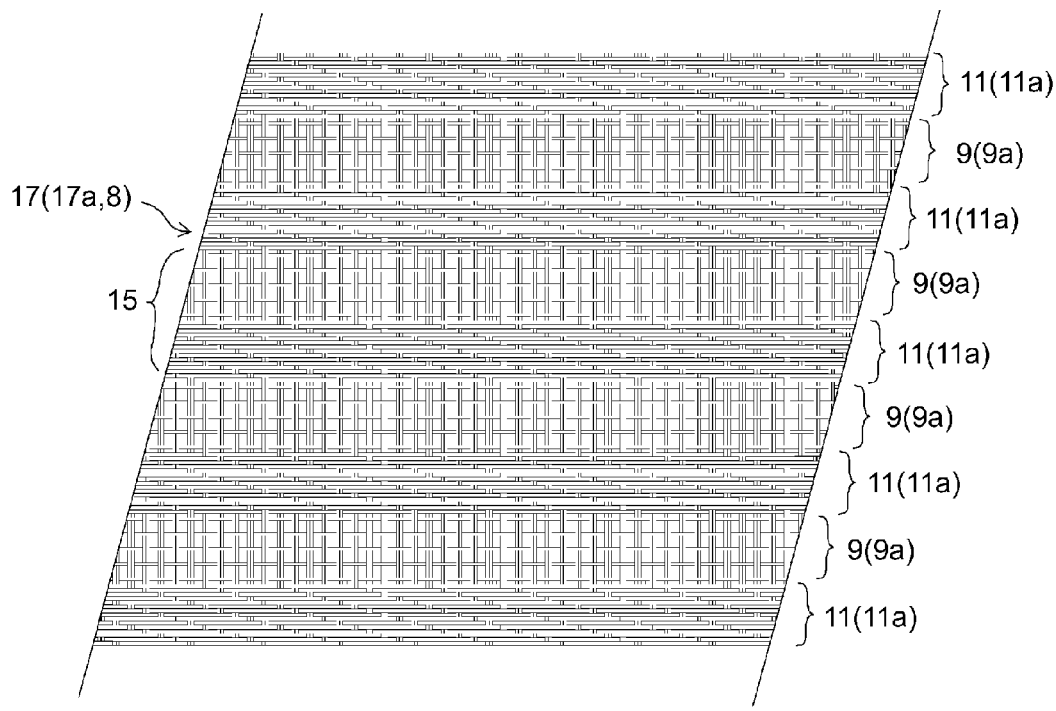

FIG. 3 is a plan view of a basic constitution comprising portions with width made in plain weave and portions with width made in satin weave comprising woven stripes.

Figure 4:
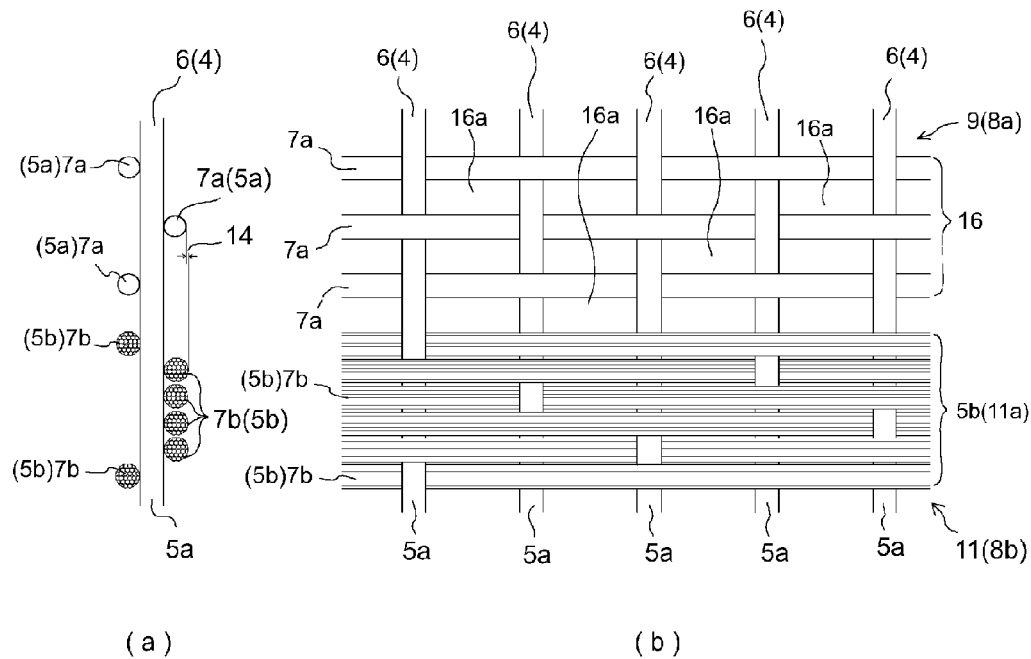

FIG. 4 shows a side view and a plan view of a weave pattern having high air permeability and small step comprising a portion made in plain weave with a weave pattern having high air permeability employing weft yarn comprising monofilament yarn and warp yarn making up a low-density weave pattern comprising monofilament yarn, and a portion made in satin weave comprising warp yarn making up a high-density weave pattern employing multifilament yarn and weft yarn employing the foregoing monofilament yarn.

Figure 5:
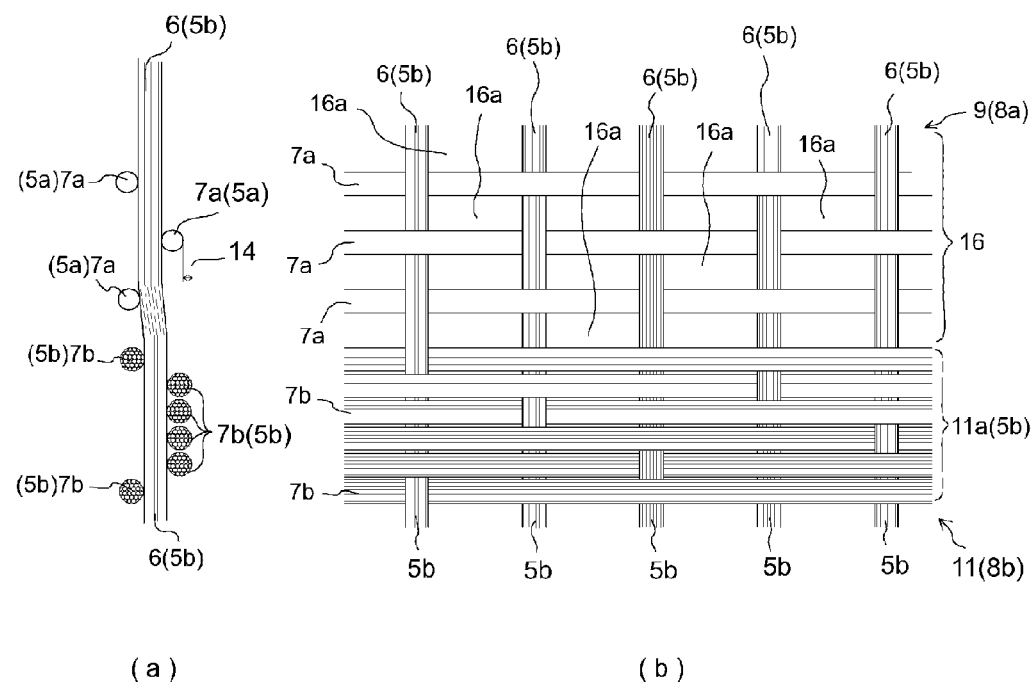

FIG. 5 shows a side view and a plan view of a weave pattern having high air permeability and large step comprising a portion made in plain weave with a weave pattern having high air permeability employing weft yarn comprising multifilament yarn and warp yarn making up a low-density weave pattern comprising monofilament yarn, and a portion made in satin weave comprising warp yarn making up a high-density weave pattern employing multifilament yarn and weft yarn employing the foregoing multifilament yarn.

Figure 6:
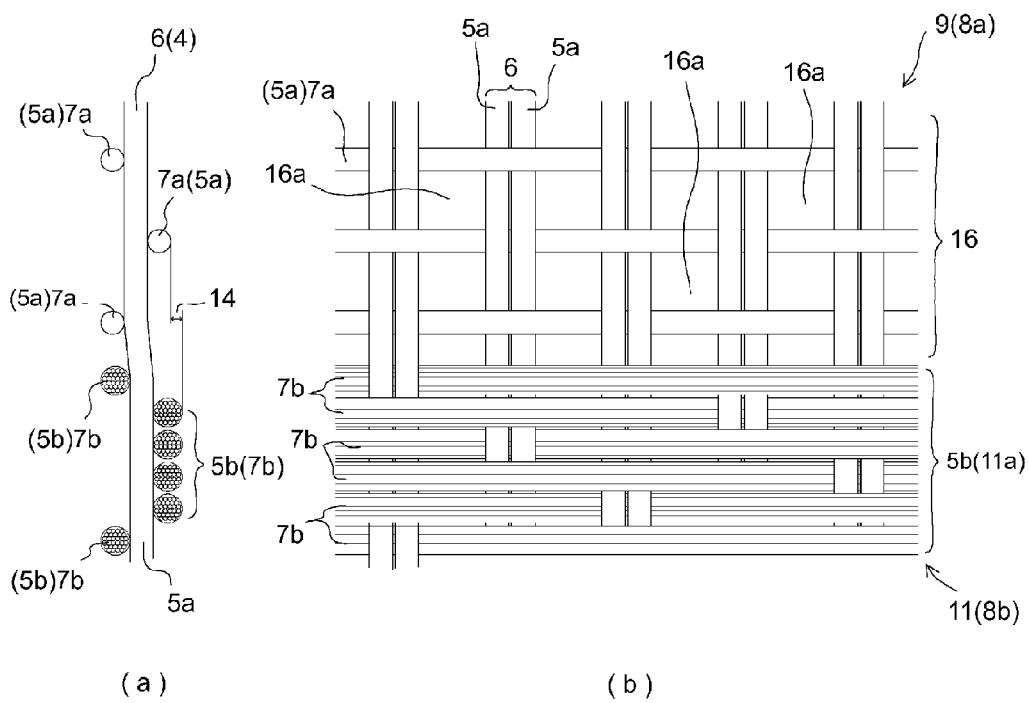

FIG. 6 shows a side view and a plan view of a weave pattern having high air permeability and large step comprising a portion made in plain weave with a low-density weave pattern having low air permeability employing weft yarn comprising two monofilament yarns and warp yarn comprising monofilament yarn, and a portion made in satin weave with a high-density weave pattern employing warp yarn comprising multifilament yarn and weft yarn comprising the foregoing two monofilament yarns.

Figure 7:
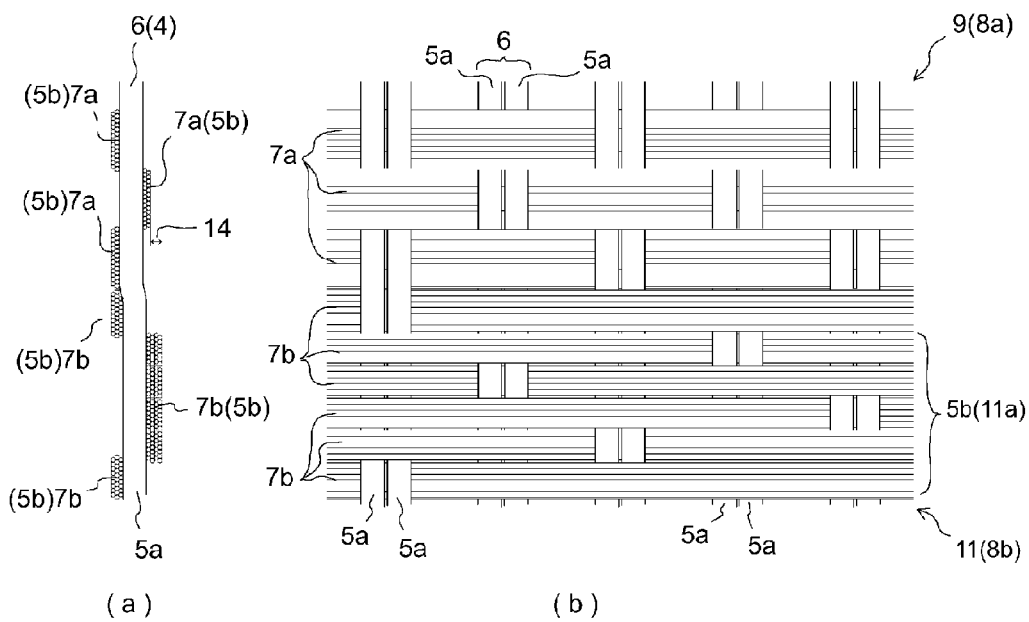

FIG. 7 shows a side view and a plan view of a weave pattern having somewhat low air permeability and large step comprising a portion made in plain weave with a low-density weave pattern having relatively low air permeability employing weft yarn comprising two monofilament yarns and warp yarn comprising spun continuous yarn or spun discontinuous yarn which is multifilament yarn having a small number of filaments, and a portion made in satin weave with a high-density weave pattern employing warp yarn comprising spun continuous yarn or spun discontinuous yarn which is multifilament yarn having a large number of filaments and weft yarn comprising the foregoing two monofilament yarns.

Figure 8:
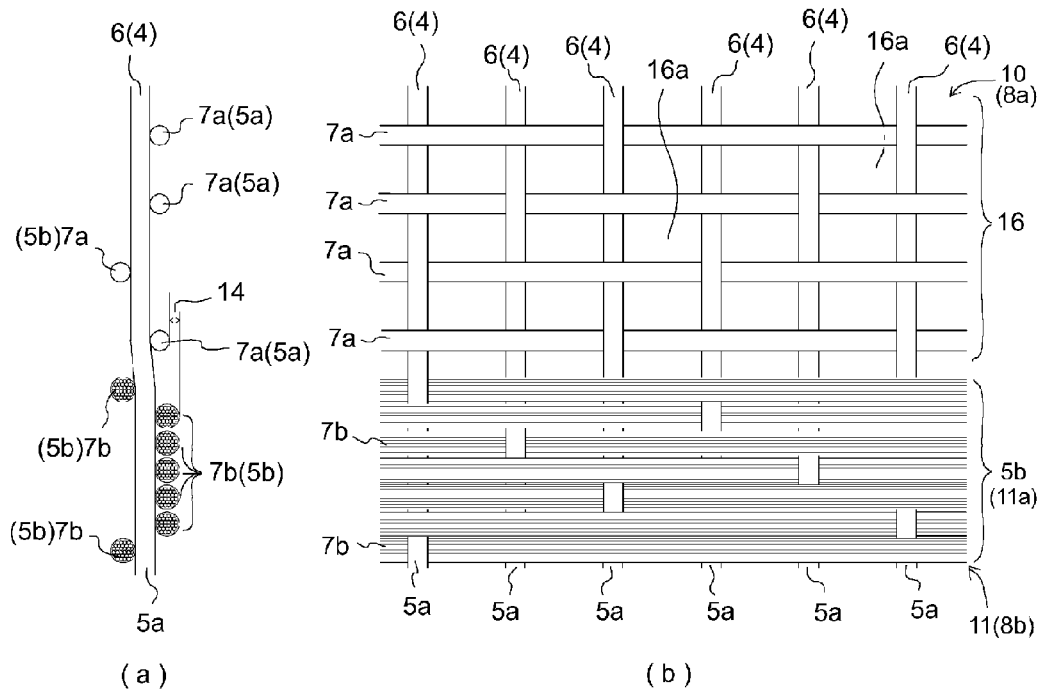

FIG. 8 shows a side view and a plan view of a weave pattern having high air permeability comprising a portion made in twill weave with a weave pattern having high air permeability employing monofilament weft yarn and monofilament warp yarn, and a portion made in satin weave making up a high-density weave pattern comprising the foregoing monofilament weft yarn and multifilament warp yarn.

Figure 9:
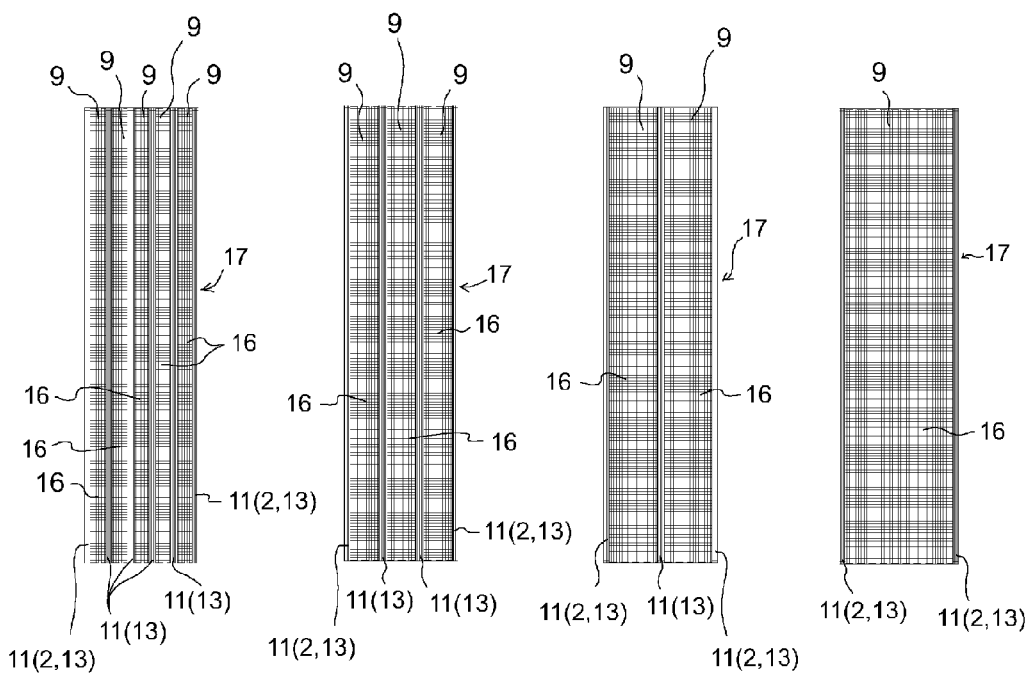

FIG. 9 is a plan view showing four examples of stripes of arbitrarily chosen width and pitch at conveyor belts comprising stripes in accordance with the present invention.

Figure 10:
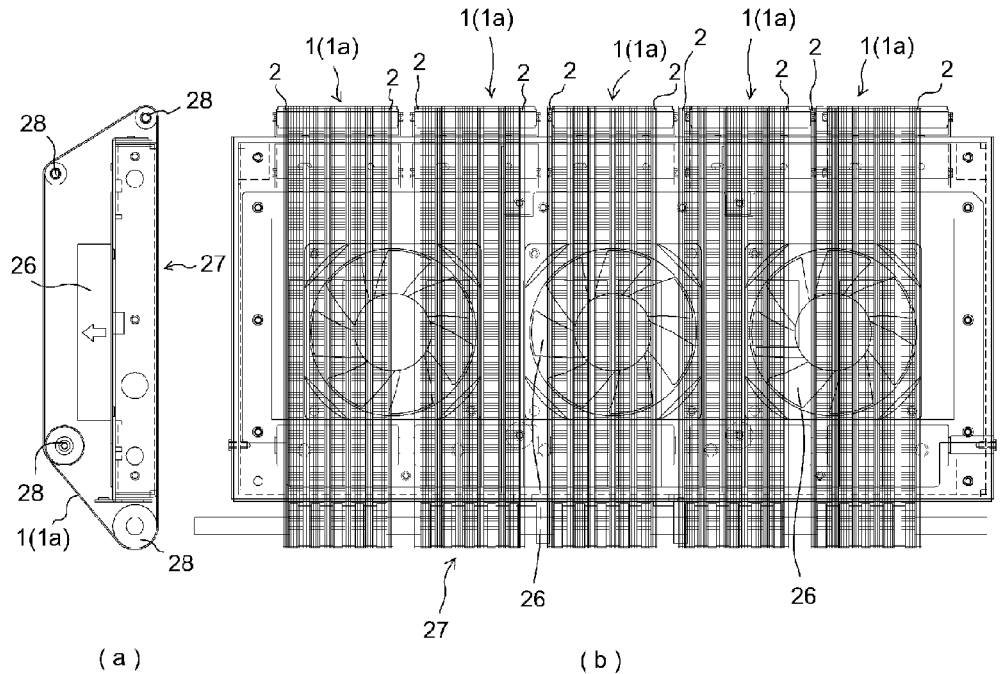

FIG. 10 shows a side view and a plan view showing in schematic fashion a conveyor apparatus which employs a conveyor belt.

Figure 11:
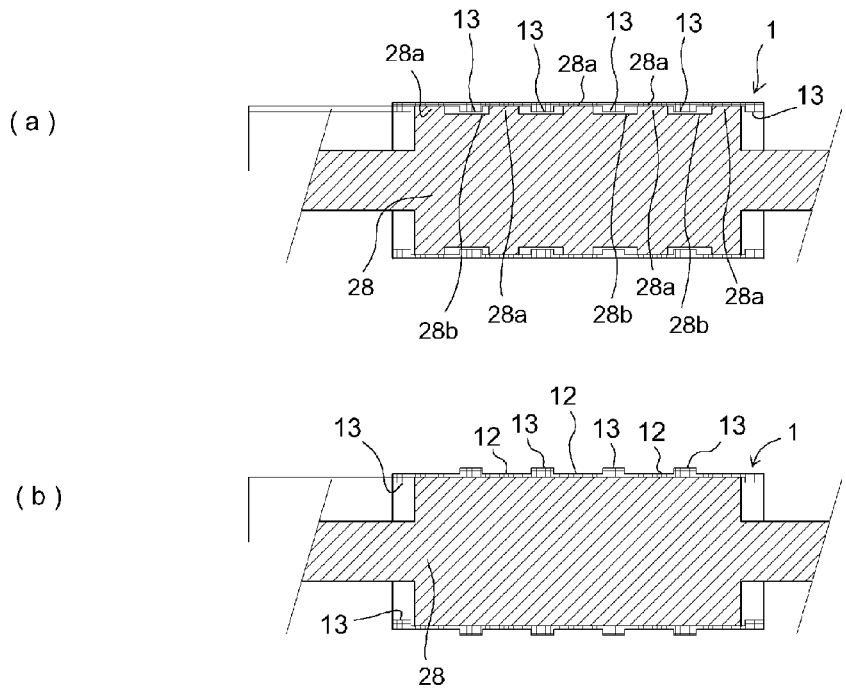

FIG. 11 shows sectional views of exemplary constitutions of meander prevention means comprising a conveyor belt and belt pulley(s), (a) being a drawing showing ridges which mesh with a belt pulley, and (b) being a drawing showing steps which are provided at a conveyor belt.

Figure 12:
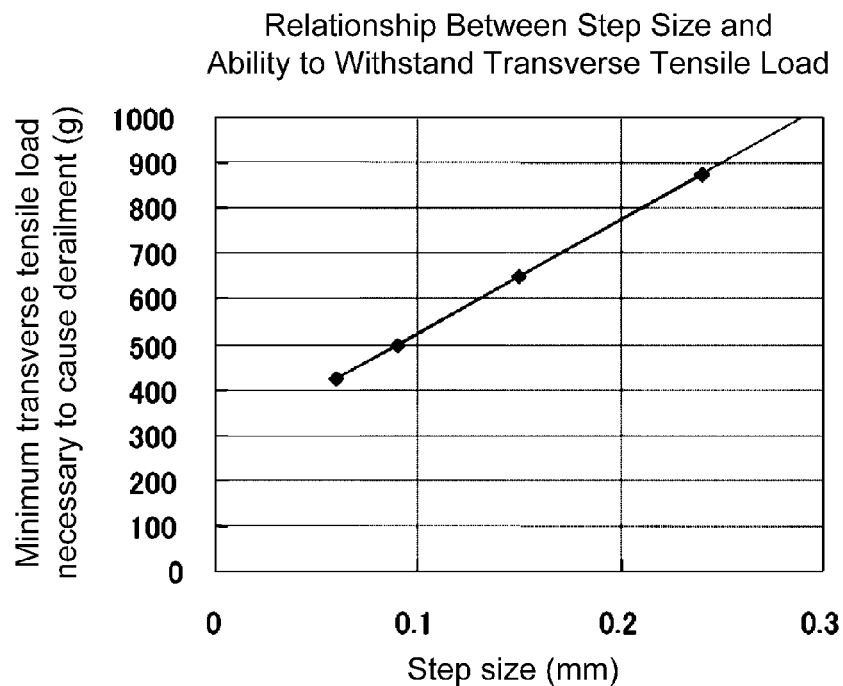

FIG. 12 is a graph showing relationship between ability to withstand a transverse tensile load (i.e., derailment load; minimum transverse tensile load necessary to cause derailment; g), which is plotted on the vertical axis, as a function of conveyor belt step size (mm), which is plotted on the horizontal axis.

Figure 13:
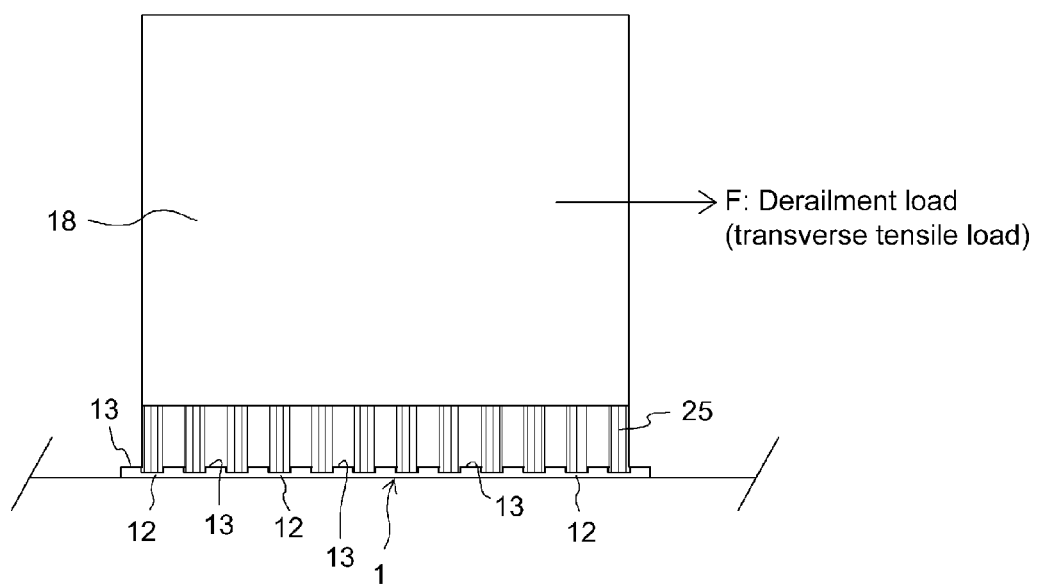

FIG. 13 is a drawing showing method used for derailment load testing.

Figure 14:
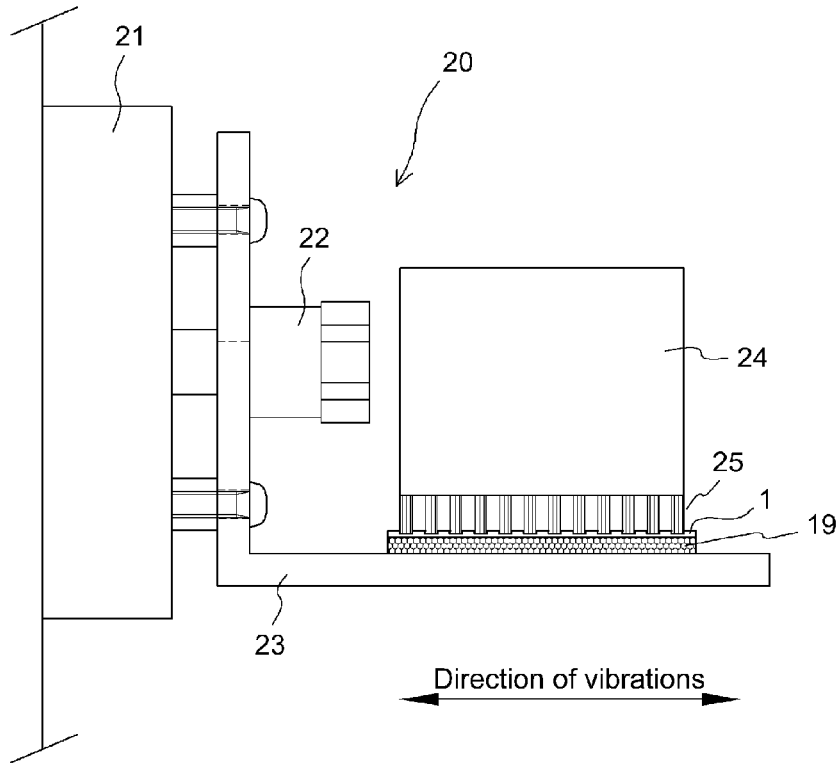

FIG. 14 is a drawing showing an apparatus used for vibration testing.

Figure 15:
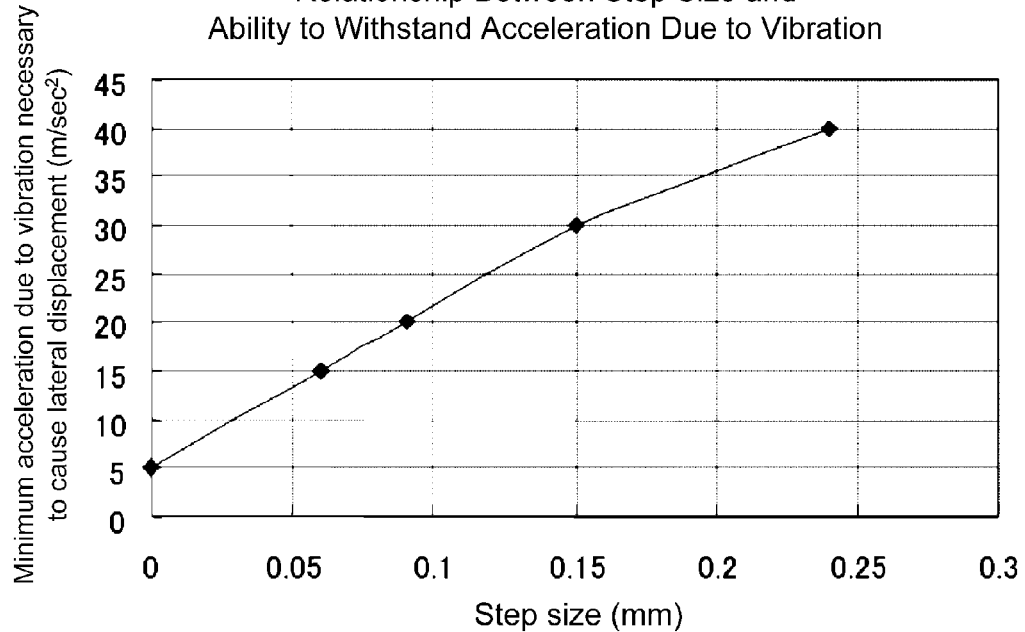

FIG. 15 is a graph showing relationship between ability to withstand acceleration due to vibration (i.e., minimum acceleration due to vibration necessary to cause lateral displacement; m/sec$^2$) and conveyor belt step size (mm), as measured during vibration testing.

DETAILED DESCRIPTION

Figure 1:
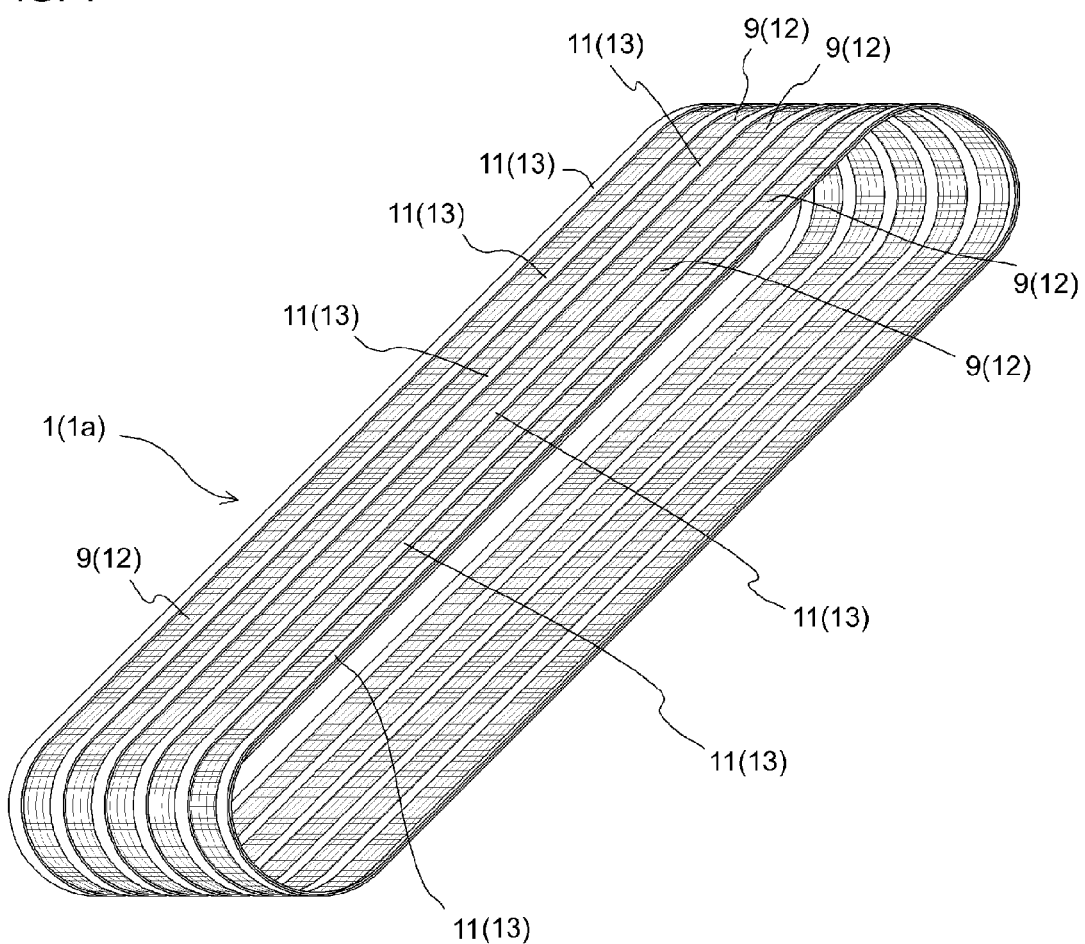
FIG. 1 is a perspective view showing the external appearance of a conveyor belt (hereinafter also referred to as "mesh belt") comprising woven stripes.

Below, embodiments of the present invention are described with reference to tables and drawings. First, a first embodiment occurs in the context of a conveyor belt 1 in which suction of air occurs as paper or other such sheet-like objects or medicinal pills, and/or bunches of boiled noodles, and/or dried goods that are food items in the form of small objects, or other such objects placed thereon, are conveyed thereby. Where the speed of conveyor belt 1 which conveys such objects is low, it will be enough for this conveyor belt 1, which may be an endless loop belt 1a as shown in FIG. 1, to be mounted on belt pulleys 28 as shown in FIG. 10, and for these belt pulleys 28 to be driven in rotary fashion by a motor so as to cause objects placed on the conveyor belt 1 to move at constant speed. However, as already explained under Technical Field, above, taking the example of an electrophotographic apparatus in the form of copier means of the type which operates through transfer of toner, to supply the sheet-like object, i.e., copier paper, thereto, especially where the copier means is an electrophotographic apparatus which is a high-end apparatus, because the paper is conveyed at high speed within the apparatus, the paper is buffeted due to air resistance and the like and is made to float above the conveyor belt 1 as it is being conveyed, as a result of which it cannot be conveyed properly. Now, a plan view of conveyor belt 1 at FIG. 1 is shown at (a) in FIG. 2. At (a) in this FIG. 2, low-density weave patterns 8a comprising locations made in plain weave 9 which comprise mesh 16 having gaps 16a in the interstices thereof are formed between high-density weave patterns 8b which comprise locations made in satin weave 11, these locations made in plain weave 9 and these locations made in satin weave 11 being formed in alternating fashion to obtain striped woven fabric 17 comprising stripes 17a, a conveyor belt 1 comprising this striped woven fabric 17 being shown in plan view. Moreover, shown for comparison at (b) in FIG. 2 is a plan view of an ordinary conventional rubber belt 29 having a multiplicity of through-holes 29a. Moreover, shown at FIG. 3 is a plan view of basic weave pattern 8 comprising width portion 9a made in plain weave 9 and width 11a portion made in satin weave 11, i.e., striped woven fabric 17 having stripes 17a, in accordance with the present invention.

This weave pattern 8 of conveyor belt 1 is a first working example which is shown in FIG. 4, and as shown at this first working example, weft yarn 6 which is in a direction perpendicular to the conveying direction is formed from a single type of monofilament yarn 4, while warp yarn 7 which is in the conveying direction is formed from two types of yarns, these being warp yarn 7a which makes up low-density weave pattern 8a and warp yarn 7b which makes up high-density weave pattern 8b. Moreover, regions of low-density weave patterns 8a and regions of high-density weave patterns 8b are formed from this one type of weft yarn 6 and these two types of warp yarn 7 in alternating fashion in the width direction of conveyor belt 1, regions of low-density weave patterns 8a being formed from lattice-like mesh 16 having gaps 16a and comprising locations made in plain weave 9, and regions of high-density weave patterns 8b being formed from locations made in satin weave 11. Moreover, as shown in FIG. 3, the respective regions have prescribed widths 9a, 9b; furthermore, as shown at (a) in FIG. 2, portions made in satin weave 11 with the aforementioned high-density weave pattern 8b are arranged at the side ends 2 of conveyor belt 1 to form striped woven fabric 17 comprising banded stripes 17a. This banded striped woven fabric 17 is used to obtain loop belt 1a shown in FIG. 1, which is an endless belt.

At a copier means comprising an electrophotographic apparatus, striped woven fabric 17 woven in the pattern of banded stripes 17a shown at FIG. 2 (*a*) is employed as conveyor belt 1 to convey sheet-like objects, i.e., copier paper. In such case, these stripes 17a comprising bands are arranged so as to be oriented in the conveying direction of the conveyor belt 1. The stripes 17a of this conveyor belt 1 are formed from portions comprising locations made in plain weave 9 with weave pattern 8a where density per unit width is of low density, and portions comprising locations made in satin weave 11 with weave pattern 8b where density per unit width is of high density. As shown in FIG. 4, these portions made in plain weave 9 are produced by weaving together weft yarn 6 which is monofilament yarn 5a and warp yarn 7a making up low-density weave pattern 8a at which monofilament yarn 5a forms regions of weave pattern 8a having low density per unit width at prescribed intervals. Conversely, the portions made in satin weave 11 are produced by weaving together weft yarn 6 which is the same monofilament yarn 5a as at the portions made in plain weave 9 described above, and not less than five warp yarns 7b arranged in adjacent fashion and making up high-density weave pattern 8b comprising monofilament yarn 5a and/or multifilament yarn 5b at regions containing weave pattern 8b of high density per unit width. Moreover, as shown in FIG. 9, the side ends 2 of conveyor belt 1 comprise regions making up high-density weave patterns 8b made in satin weave 11. Moreover, at this conveyor belt 1, regions made in plain weave 9 that are woven from warp yarn 7a making up low-density weave patterns and weft yarn 6 which is monofilament yarn 5a form lattice-like mesh 16 having gaps 16a. In addition, striped woven fabric 17 is formed which has a pattern of stripes 17a due to these locations made in plain weave 9 and these locations made in satin weave 11. The gaps 16a in the mesh 16 at locations made in this plain weave 9 ensure good air permeability, creating a weave pattern 8 of high air permeability, so as to permit a sheet-like object serving as object to be conveyed to be drawn toward and brought into intimate contact with conveyor belt 1 by air suction. In addition, this weave pattern 8 is used to form conveyor belt 1 comprising striped woven fabric 17 in the context of an electrophotographic apparatus serving as copier means. In the example shown in FIG. 4, note that the steps 14 between locations made in plain weave 9 comprising warp yarn 7a making up low-density weave patterns 8a, and locations made in satin weave 11 comprising warp yarn 7b making up high-density weave patterns 8b, are small.

In the second embodiment, the striped woven fabric 17 from which conveyor belt 1 is constituted comprises woven fabric having a weave pattern 8 which, like that of the first embodiment, permits high air permeability as shown in FIG. 4. However, while this second embodiment is similar to the first embodiment with respect to the fact that portions made in plain weave 9 where the lattice-like mesh 16 is a low-density weave pattern 8a comprise warp yarn 7a which makes up low-density weave patterns 8a comprising monofilament yarn 5a, it differs from the first embodiment with respect to the fact that weft yarn 6 comprises multifilament yarn 5b as shown in FIG. 5. Accordingly, portions made in satin weave 11 shown in FIG. 5 are produced by weaving together weft yarn 6 made from multifilament yarn 5b which is the same weft yarn as at locations made in plain weave 9 and not less than five warp yarns 7b that make up high-density weave pattern 8b which comprises multifilament yarn 5b at regions containing weave patterns 8b of high density per unit width. However, these are such that warp yarn 7b making up high-density weave pattern 8b forming portions made in satin weave 11 comprises warp yarn 7 which is of somewhat larger diameter than warp yarn 7a making up low-density weave pattern 8a forming portions made in plain weave 9. At this striped woven fabric 17, steps 14 are therefore formed between regions in which warp yarn 7a makes up low-density weave patterns 8a at portions made in plain weave 9 and regions in which warp yarn 7b makes up high-density weave patterns 8b at portions made in satin weave 11. However, as was the case at the first embodiment, the size of these steps is small. Moreover, at this striped woven fabric 17, width 9a of portions made in plain weave 9 with low-density weave pattern 8a formed from warp yarn 7a making up low-density weave pattern 8a and width 11a of portions made in satin weave 11 with high-density weave pattern 8b formed from warp yarn 7b making up high-density weave pattern 8b are adjusted as desired to form a weave pattern 8 in which width 9a of locations made in plain weave 9 and width 11a of locations made in satin weave 11 occur in alternating fashion as shown in FIG. 3. This weave pattern 8 permits formation of a conveyor belt 1 made of striped woven fabric 17 in which the weave pattern 8 is of high air permeability and in which gaps 16a required for suction of air therethrough are present. Note that because gaps 16a are present at portions containing low-density weave patterns 8a, i.e., at portions made in plain weave 9, if an object to be conveyed is placed thereon when this is used as a conveyor belt 1, pressure will be exerted on weft yarn 6 comprising multifilament yarn 5b at these portions made in plain weave 9, causing spreading to occur in a manner that is more flattened than is the case at portions made in satin weave 11. Moreover, the side ends 2 of conveyor belt 1 are formed from portions made in satin weave 11 shown in FIG. 9 which are regions of weave pattern 8 containing warp yarn 7b making up high-density weave pattern 8b.

In the third embodiment, conveyor belt 1 comprising striped woven fabric 17 having banded stripes 17a is such that, as shown in FIG. 6, gaps 16a in lattice-like mesh 16 at portions made in plain weave 9 are formed by weaving together weft yarn 6 employing two monofilament yarns 5a and monofilament yarn 5a which is warp yarn 7a making up low-density weave pattern 8a, these gaps 16a permitting suction of air therethrough which is required when this is used as a conveyor belt 1. Moreover, portions made in satin weave 11 which are adjacent to portions made in plain weave 9 are produced by weaving together weft yarn 6 employing two monofilament yarns 5a identical to the monofilament yarn 5a at locations made in plain weave 9, and, for example, not less than five warp yarns 7b making up high-density weave pattern 8b comprising multifilament yarn 5b at regions containing high-density weave pattern 8b. Moreover, the side ends 2 of conveyor belt 1 are formed from portions made in satin weave 11 which are regions in which the weave pattern 8 contains warp yarn 7b making up high-density weave pattern 8b. It should be mentioned that multifilament yarn 5b at warp yarn 7b which forms regions of high-density weave pattern 8b at locations made in satin weave 11 is made to comprise soft-twist yarn so as to prevent occurrence of raggedness as a result of needle rotation. Moreover, as can be seen at (a) in FIG. 2, this conveyor belt 1 is formed from striped woven fabric 17 which is of high air permeability and which has a pattern of banded stripes 17a due to presence of these portions made in plain weave 9 and these portions made in satin weave 11. Note that the steps 14 which are formed between locations made in plain weave 9 which comprise warp yarn 7a making up low-density weave pattern 8a and locations made in satin weave 11 which comprise warp yarn 7b making up high-density weave pattern 8b in the weave pattern 8 shown in FIG. 6 are somewhat larger than the steps 14 in FIG. 4.

In the fourth embodiment, the striped woven fabric 17 from which conveyor belt 1 is constituted is formed from portions made in plain weave 9 with weave pattern 8a of somewhat low density which is produced by weaving together weft yarn 6 comprising two monofilament yarns 5a and a plurality of warp yarns 7a making up low-density weave pattern 8a which comprises a plurality of multifilament yarns 5b that are spread out laterally, and portions made in satin weave 11 with high-density weave pattern 8b which are produced by weaving together two weft yarns 6 identical to the two monofilament yarns 5a of the weft yarns 6 at locations made in plain weave 9 and warp yarns 7b making up high-density weave pattern 8b which comprise not less than five spun continuous yarns, to obtain the weave pattern 8 having low air permeability which is shown in FIG. 7. That is, portions made in plain weave 9 with low-density weave pattern 8a woven from weft yarn 6 comprising monofilament yarn 5a and warp yarn 7a making up low-density weave patterns 8a comprising monofilament yarn 5a at low density which are regions of small thickness are present between or among a plurality of portions made in satin weave 11 which are high-density weave patterns 8b of large thickness woven from weft yarn 6 comprising monofilament yarn 5a and warp yarn 7b making up high-density weave patterns 8b comprising spun continuous yarn or spun discontinuous yarn, striped woven fabric 17 having stripes 17a shown at (a) in FIG. 2 being formed therefrom. These stripes 17a are formed, as shown in FIG. 1, by recessed grooves 12 made up of portions made in plain weave 9 with width 9a and projecting ridges 13 made up of portions made in satin weave 11 with width 11a, large steps 14 being formed between these recessed grooves 12 and these projecting ridges 13, to form a weave pattern 8 in which locations made in plain weave 9 with width 9a and locations made in satin weave 11 with width 11a are present in alternating fashion. Stripes 17a having a weave pattern 8 which is of low air permeability during suction of air are formed from this weave pattern 8, conveyor belt 1 being formed from this striped woven fabric 17.

The aforementioned portions made in plain weave 9, despite the fact that the warp yarn 7a therewithin is multifilament yarn 5b, will be of small thickness, as indicated schematically by the two layers at warp yarn 7a in FIG. 7; and so, because density is low, suction of air therethrough will occur. Conversely, the portions made in satin weave 11, even though the warp yarn 7b therewithin is multifilament yarn 5b, will be of large thickness, as indicated schematically by the four layers at warp yarn 7b in FIG. 7; and so, because density is higher than at the two-layer portions made in plain weave, air will not tend to be sucked therethrough.

In the fifth embodiment, as shown in FIG. 8, the striped woven fabric 17 making up conveyor belt 1 comprises portions made in twill weave 10 with low-density weave pattern 8a which is of high air permeability and which is woven using weft yarn 6 which contains monofilament yarn 5a and warp yarn 7a making up low-density weave pattern 8a which contains monofilament yarn 5a, and portions made in satin weave 11 comprising warp yarn 7b making up high-density weave pattern 8b which contains multifilament yarn 5b and weft yarn 5a which contains the aforementioned monofilament yarn, to form conveyor belt 1 from striped woven fabric 17 which is of high air permeability. Steps 14 are formed by warp yarn 7a that makes up locations made in twill weave 10 which are weave patterns 8a of small thickness and low density and which have high air permeability and warp yarn 7b which is of large thickness and which makes up weave patterns 8b of high density.

In the sixth embodiment, at the striped woven fabric 17 making up the conveyor belt 1 of the foregoing respective embodiments, stretch yarn which is flexible is employed as warp yarn 7, i.e., as warp yarn 7a which makes up low-density weave pattern 8a and as warp yarn 7b which makes up high-density weave pattern 8b. Accordingly, the conveyor belt 1 formed using this flexible stretch yarn will be flexible in the direction of the stripes 17a of striped woven fabric 17. Because conveyor belt 1 is thus made to have flexibility, when it is made into an endless loop belt 1a which is suspended between a plurality of belt pulleys 28, even where the distance between two opposed belt pulleys 28 is in error by a certain amount, being longer by a certain amount than the length of the loop belt 1a, it will be possible to suspend loop belt 1a therebetween. In addition, even where there is a certain degree of difference in weight among the objects placed on loop belt 1a, it will be possible for rotation to proceed smoothly about the rotating shaft, without occurrence of situations in which increased tension of loop belt 1a between a plurality of belt pulleys 28 due to weight makes it impossible for belt pulleys 28 to rotate. As a result, it is possible to achieve a conveyor belt 1 that is satisfactorily capable of delivering conveyor functionality.

In the seventh embodiment, at the striped woven fabric 17 making up the conveyor belt 1 of the foregoing respective embodiments, the striped woven fabric 17 is formed from woven yarn wherein at least warp yarn 7a which makes up low-density weave pattern 8a or warp yarn 7b which makes up high-density weave pattern 8b contains electrically conductive filament yarn; and moreover, the conveyor belt 1 is formed from striped woven fabric 17 having this electrically conductive filament yarn. By causing electricity to flow through this electrically conductive filament yarn at striped woven fabric 17 of conveyor belt 1, it is possible to cause an electric field to be formed about the periphery of the electrically conductive filament yarn, such that when conveyor belt 1 is used for high-speed of conveyance of sheet-like objects, e.g., copier paper, or small objects such as medicinal pills, or other such objects to be conveyed, it is possible to cause such conveyed objects to be held by static electricity to conveyor belt 17 as they are conveyed, so as to prevent such conveyed objects from floating above the conveyor belt 17, which is moving at high speed, as such conveyed objects are buffeted by air. The conveyor belt 1 of this embodiment is thus a conveyor belt 1 comprising striped woven fabric 17 that is capable of conveying objects at high speed while they are electrostatically held thereto.

In the eighth embodiment, the striped woven fabric 17 making up the conveyor belt 1 in the foregoing embodiments is produced by weaving together weft yarn 6 and/or warp yarn 7 formed from monofilament yarn 5a and/or multifilament yarn 5b containing material selected from among metal fibers, natural fibers, artificial fibers, and/or synthetic fibers. Monofilament yarn 5a and/or multifilament yarn 5b comprising such material(s) is used to form striped woven fabric 17 having prescribed step(s) 14 and prescribed pitch(es) 15. In such case, at this striped woven fabric 17, to prevent lateral displacement of warp yarn 7 in the direction of weft yarn 6 and to adjust the force with which objects to be conveyed are held to conveyor belt 1, of these metal fibers, natural fibers, artificial fibers, and synthetic fibers of which warp yarn 7 may be composed, the filament yarn 4 used for fibers other than the metal fibers is made to contain electrically conductive filament yarn. In correspondence to the content of the electrically conductive filament yarn which is contained within this filament yarn 4, a coating agent or backing agent which is formulated so as to have resistance as desired is used to carry out coating treatment or backing treatment of the filament yarn 4 from which warp yarn 7 is formed, and a conveyor belt 1 is formed which comprises striped woven fabric 17 produced by weaving using this warp yarn 7. The conveyor belt 1 will thus comprise striped woven fabric 17 which is such that, by applying a voltage to this electrically conductive filament yarn at striped woven fabric 17 of conveyor belt 1, it will be possible, as was the case at the seventh embodiment, to cause an electric field to be formed about the periphery of the electrically conductive filament yarn 3, such that when conveyor belt 1 is used for high-speed of conveyance of sheet-like objects, e.g., copier paper, or small objects such as medicinal pills, or other such objects to be conveyed, it will be possible to cause such conveyed objects to be held by static electricity to conveyor belt 1 as they are conveyed, so as to prevent such conveyed objects from floating above the conveyor belt 1, which is moving at high speed, as such conveyed objects are buffeted by air.

Striped woven fabric 17 making up the conveyor belt 1 in the foregoing embodiments is formed from weave pattern 8 which is woven by a needle loom or a shuttle loom. Of these, while a needle loom will have a nonadjustable weaving width that might be, for example, 15 mm, 20 mm, or some other constant value, it permits weaving at high speeds. On the other hand, while a shuttle loom will have a weaving width that is capable of being set in stepwise fashion within a certain range of values such as, for example, 6 mm to 63 mm, there is a limit to how fast it can be made to weave. Furthermore, in the present embodiment, striped woven fabric 17 woven by such a loom is used to form conveyor belt 1 comprising endless loop belt 1a.

The ninth embodiment is a conveyor apparatus 27 that employs a conveyor belt 1 in accordance with any of the foregoing first through eighth embodiments to convey objects to be conveyed at high speed through use of air suction. This conveyor apparatus 27 employs conveyor belt 1 comprising striped woven fabric 17 which has gaps 16a and which forms lattice-like mesh 16, and is capable of causing objects to be conveyed which comprise sheet-like objects, or paper, or medicinal pills, or other such small objects, to be conveyed in such fashion that they are held by air suction which acts thereon by way of mesh 16, so that such conveyed objects are not disturbed by air resistance which is present when they are conveyed at high speed. That is, because conveyor belt 1 in the first through eighth embodiments permits suction of air, this conveyor belt 1 permits a high-speed conveyor apparatus, e.g., a conveyor apparatus 27 that causes copier paper conveyed at the interior of an electrophotographic apparatus to be conveyed at high speed through use of air suction.

This embodiment thus takes place in the context of a conveyor apparatus 27 for conveying objects to be conveyed at high speed with suction of air from a mesh 16 as shown in FIG. 10. This conveyor belt 1 for high-speed conveyance which carries out conveyance through suction of air may, for example, be formed from striped woven fabric 17 which has grooves 12 comprising mesh 16 at locations made in plain weave 9 and ridges 13 in high-density weave patterns 8b at locations made in satin weave 11, as shown in FIG. 9. As can be seen at FIG. 4 through FIG. 7, steps 14 are formed between such ridges 13 at locations made in satin weave 11 and such grooves 12 at locations made in plain weave 9 at striped woven fabric 17 of conveyor belt 1. Moreover, striped woven fabric 17 which has stripes 17a in the long direction of conveyor belt 1 is formed by steps 14 between ridges 13 at locations made in satin weave 11 and grooves 12 at locations made in plain weave 9 comprising mesh 16 having gaps 16a. Because conveyor belt 1 is thus made to have stripes 17a formed from steps 14, lateral displacement and meandering of conveyor belt 1 with respect to belt pulleys 28, as well as lateral displacement and meandering of conveyed objects on conveyor belt 1, can be prevented. FIG. 9 shows conveyor apparatus 27 which employs suction of air and which conveys objects to be conveyed at high speed while carrying out suction of air by means of air fan 26 as loop belt 1a serving as conveyor belt 1 is made to travel on belt pulleys 28. A constitution for preventing meandering and/or lateral displacement of this conveyor belt 1 is shown in FIG. 11. Shown at (a) in FIG. 11 is a situation in which meandering and lateral displacement of conveyor belt 1 with respect to belt pulleys 28 is prevented, this being accomplished by providing projecting regions 28a and recessed regions 28b in alternating fashion in the direction of rotation at the outside circumference of the rollers of belt pulleys 28, and causing conveyor belt 1 to be suspended therefrom in such fashion that recessed grooves 12 comprising mesh 16 at locations made in plain weave 9 and projecting ridges 13 at locations made in satin weave 11 abut in opposing fashion and face these projecting regions 28a and recessed regions 28b which are provided at the outside circumference of the rollers of belt pulleys 28. Shown at (b) in FIG. 11 is a situation permitting conveyance of conveyed objects 18 without occurrence of meandering or lateral displacement, this being possible due to the fact that, while the outside circumferences of the rollers of belt pulleys 28 are unmodified, being cylindrical, the surface of conveyor belt 1 on which there are recessed grooves 12 comprising mesh 16 at locations made in plain weave 9 and projecting ridges 13 at locations made in satin weave 11 is used as the surface on which the conveyed objects will be placed, the ridges 13 at portions made in satin weave 11 at side ends 2 of conveyor belt 1 are provided at the backside of locations made in satin weave 11, and conveyor belt 1 is suspended from belt pulleys 28 in such fashion as to cause these ridges 13 at locations made in satin weave 11 at the side ends 2 to engage with the ends of the rollers of belt pulleys 28 in such fashion as to be directed toward the surfaces of the rollers of belt pulleys 28, with conveyed objects 18 being placed on recessed grooves 12 comprising mesh 16 at locations made in plain weave 9 at conveyor belt 1.

The graph in FIG. 12 shows the relationship between size of step 14 and minimum transverse tensile load necessary to cause derailment when conveyor belt 1 is suspended between belt pulleys 28 and is made to travel therealong, the horizontal axis being the size of the step 14 between locations made in satin weave 11 and locations made in plain weave 9 at conveyor belt 1, and the vertical axis being the minimum transverse tensile load at which lateral displacement of conveyor belt 1 was found to occur. Note that a normal (i.e., acting in a direction tending to increase the force of friction between the conveyor belt and the object being conveyed thereon) load per unit area of 32 g per cm² was employed during this testing. As is clear from the relationship shown in this graph, increasing the size of the step 14 between locations made in satin weave 11 and locations made in plain weave 9 results in an increase in the minimum transverse tensile load necessary to cause derailment (i.e., ability to withstand a transverse tensile load). These results confirm that when objects to be conveyed are conveyed using a conveyor belt 1 in accordance with the present invention it will be possible by properly providing steps 14 to prevent meandering and to prevent lateral displacement of conveyor belt 1.

The method used for this lateral displacement testing will be described using the apparatus shown in FIG. 13. As shown in FIG. 13, a transverse tensile load F in the direction of the arrow, this being perpendicular to the direction of stripes 17a comprising grooves 12 and ridges 13 and in a direction tending to cause derailment, was applied to an object 24 having a prescribed weight per unit area due to the normal load with which gravity caused this object to be pressed against the conveyor belt, to determine the relationship between the step size and the transverse load at which lateral displacement occurred.

Furthermore, vibration testing was carried out using vibration source 21 at the vibration testing apparatus 20 shown in FIG. 14. At this vibration testing apparatus 20, vibration testing was carried out using vibration source 21. At this vibration testing apparatus 20, the object 24 was mechanically coupled to vibration source 21, being placed over mounting fixture 25 serving as stripe guide, foam 19 being disposed above L-shaped angle bar 23, pickup sensor 22 being used to detect the magnitude of vibration.

The results of testing performed under these conditions on an object 24 similar to that shown in FIG. 14 when foam 19 serving as elastic member was placed below conveyor belt 1 for preventing lateral displacement are shown in the graph at FIG. 15. During this testing, normal load per unit area was 108 g per cm², and vibration frequency was 50 Hz. As is clear from the relationship shown in this graph, increasing the size of the step 14 between locations made in satin weave 11 and locations made in plain weave 9 results in an increase in resistance to lateral displacement as a result of acceleration due to vibration.

These results confirm that when objects to be conveyed are conveyed using a conveyor belt 1 in accordance with the present invention it will be possible by properly providing steps 14 to reduce susceptibility of conveyor belt 1 to lateral displacement as a result of acceleration due to vibration.

TABLE 1 presents data in connection with steps 14 and weave patterns 8 at conveyor belts 1 in accordance with the present invention. Sample A and Sample B at TABLE 1 provide a comparison of use of monofilament yarn 5a versus multifilament yarn 5b as warp yarn 7a making up low-density weave pattern 8a. At this Sample A and this Sample B, although the warp yarn 7a making up low-density weave pattern 8a is different, the warp yarn 7b making up high-density weave pattern 8b is the same, and weft yarn 6 is also the same. Moreover, at Sample B, Sample C, Sample D, and Sample E, the warp yarn 7a making up low-density weave pattern 8a comprises multifilament yarn 5b in each case. At all samples in the working examples at Sample A through Sample E, the steps 14 indicated by H were compared. This H of steps 14 was taken to be H=$t_2$−$t_1$, where $t_1$ (mm) was the thickness of the portion that used warp yarn 7a in making up low-density weave pattern 8a, and $t_2$ (mm) was the thickness of the portion that used warp yarn 7b in making up high-density weave pattern 8b. Note that at the fractions, e.g., 78T/17F, shown for each yarn at TABLE 1, the T in the numerator indicates decitex, this being a unit for indicating yarn thickness; while the F in the denominator indicates fibers, this being a unit for indicating the number of fibers from which the yarn is formed.

TABLE 1

| Constitution | | Sample A | Sample B | Sample C | Sample D | Sample E |
|---|---|---|---|---|---|---|
| Yarn Material | Warp yarn 7a | Nylon 100T/F (mono-filament) | Nylon 78T/17F (multi-filament) | Nylon 56T/17F (multi-filament) | Nylon 78T/17F (multi-filament) | Nylon 78T/17F (multi-filament) |
| | Warp yarn 7b | Nylon 78T/17F | Nylon 78T/17F | Nylon 78T/17F | Nylon 122T/30F | Nylon 244T/60F |
| | Weft yarn 6 | Nylon 56T (mono-filament) | Nylon 56T (mono-filament) | Nylon 56T (mono-filament) | Nylon 56T (mono-filament) | Nylon 56T (mono-filament) |
| Weft Density (rows/cm) | | 24 | 24 | 24 | 24 | 24 |
| Loom | | Needle-Type | Needle-Type | Needle-Type | Needle-Type | Needle-Type |
| Thickness: $t_1$ (mm) (where warp yarn 8a used) | | 0.19 | 0.17 | 0.17 | 0.17 | 0.17 |
| Thickness: $t_2$ (mm) (where warp yarn 8b used) | | 0.30 | 0.23 | 0.26 | 0.32 | 0.41 |
| Step 14: H = $t_2$ − $t_1$ (mm) | | 0.11 | 0.06 | 0.09 | 0.15 | 0.24 |

TABLE 2, below, shows the results of airflow testing at striped woven fabric 17 comprising the weave pattern 8 shown in FIG. 6 which is of high air permeability and which employs monofilament yarn 5a at warp yarn 7a making up low-density weave pattern 8a versus same comprising the weave pattern 8 shown in FIG. 7 which is of low air permeability and which employs multifilament yarn 5b at warp yarn 7a making up low-density weave pattern 8a. As a result of testing it was found, where monofilament yarn 5a was used at warp yarn 7a making up low-density weave pattern 8a at Sample A, that airflow resistance R was 0.016 KPa·sec/m and Frazier-equivalent air permeability V was 778.4 cm³/cm²·sec. On the other hand, where multifilament yarn 5b was used at warp yarn 7a making up low-density weave pattern 8a at Sample B, airflow resistance R was 1.480 KPa·sec/m and Frazier-equivalent air permeability V was 8.4 cm³/cm²·sec. It is therefore clear that Sample A, which employed monofilament yarn 5a, had an airflow resistance R and an air permeability V that were on the order of approximately 100 times different from those of Sample B, which employed multifilament yarn 5b. In other words, it is clear that through appropriate selection from among monofilament yarns 5a and multifilament yarns 5b at the warp yarn 7a making up low-density weave pattern 8a, it will be possible to obtain the required airflow resistance R and air permeability V.

TABLE 2

|  | Sample A (FIG. 6) | Sample B (FIG. 7) |
|---|---|---|
| Airflow Resistance R (KPa · sec/m) | 0.016 | 1.480 |
| Frazier-Equivalent Air Permeability V (cm³/cm² · sec) | 778.4 | 8.4 |

The graph in FIG. 15 shows the relationship between size of step 14 and ability to withstand accelerations which tend to cause lateral displacement when conveyor belt 1 is suspended between belt pulleys 28 and is made to travel therealong, the horizontal axis being the size of the step 14 between locations made in satin weave 11 and locations made in plain weave 9 at conveyor belt 1, and the vertical axis being the ability to withstand accelerations (m/sec²) which tend to cause lateral displacement of conveyor belt 1. That is, FIG. 15 is a graph showing the relationship between step size and ability to withstand vibration (ability to withstand acceleration) as measured during testing using a vibration testing machine, the step size being shown on the horizontal axis, and the minimum acceleration necessary to cause lateral displacement (i.e., ability to withstand acceleration) being shown on the vertical axis. As indicated in the graph, increase in the size of the step causes increase in the magnitude of the minimum acceleration that was necessary to cause lateral displacement (i.e., ability to withstand acceleration).

The results shown at the aforementioned graphs confirm that even when one considers the possibility of vibration or the like which may act as conveyed objects 18 are being conveyed by this conveyor belt 1, it will still be possible through proper provision of steps to prevent meandering and lateral displacement.

1) When the diameter of the warp yarn 7a used at locations made in plain weave 9 at weave patterns 8a where the density of warp yarn 7 is low is less than the diameter of the warp yarn 7b used at locations made in satin weave 11 at weave patterns 8b where the density of warp yarn 7 is high, step 14 will be formed due to the difference in yarn diameter.

2) Even when the diameters of the warp yarns 7 are the same, if warp yarn 7 is multifilament yarn 5b, a difference in the degree to which weave pattern 8 causes neighboring yarns to be mutually constrained may create a step 14. That is, pitch 15 is large at locations made in plain weave 9 where the density of warp yarn 7 is low, and multifilament yarn 5b tends to spread out at warp yarn 7 which is made to be soft twist because weft yarn 6 is monofilament yarn 5a, which causes reduction in thickness. Conversely, at locations made in satin weave 11 where the density of warp yarn 7 is high, notwithstanding that warp yarn 7b is multifilament yarn 5b, spreading thereof is constrained because the warp yarns 7b are in contact with each other, which causes thickness to be greater there than at locations made in plain weave 9, permitting creation of steps 14 between locations made in satin weave 11 and locations made in plain weave 9.

Combination of 1) and 2) permits formation of a conveyor belt 1 having steps 14, and a conveyor belt 1 having high strength can be formed due to the fact that use of monofilament yarn 5a having a large diameter at warp yarn 7b in locations made in satin weave 11 permits improvement in strength, and a conveyor belt 1 having high flexibility can be manufactured as desired due to the fact that use of multifilament yarn at warp yarn 7b in locations made in satin weave 11 makes it possible for the belt which is formed to be imparted with flexibility. TABLE 3 shows the relationship between different combinations of monofilament yarn 5a and multifilament yarn 5b at warp yarn 7b in high-density portions made in satin weave 11 and at warp yarn 7a in low-density portions made in plain weave 9 or in twill weave 10 making up striped woven fabric 17, and characteristics under those conditions that include air permeability and belt strength and flexibility. VG indicates very good, GD indicates good, and OK indicates satisfactory. The monofilament yarn 5a used had higher strength than the multifilament yarn 5b. Note that because the constitution of conveyor belt 1 in accordance with the present embodiment was such that weft yarn 6 in the portions made in plain weave 9 and in the portions made in satin weave 11 was formed from the same weft yarn 6, differences in density at striped woven fabric 17 were due to differences in the density of warp yarn 7a and the density of warp yarn 7b which were respectively used thereat.

TABLE 3

| | Striped Woven Fabric 17 | | | | |
|---|---|---|---|---|---|
| Combination | Warp Yarn 7a at Locations Made in Plain Weave 9 or Locations Made in Twill Weave 10 | Warp Yarn 7b at Locations Made in Satin Weave 11 | Air Permeability | Belt Strength | Flexibility |
| 1 | Monofilament yarn 5a | Monofilament yarn 5a | GD | VG | OK |
| 2 | Monofilament yarn 5a | Multifilament yarn 5b | GD | GD | GD |
| 3 | Multifilament yarn 5b | Monofilament yarn 5a | OK | VG | OK |
| 4 | Multifilament yarn 5b | Multifilament yarn 5b | OK | GD | GD |

While embodiments of the present invention have been described above, modes of carrying out the present invention are not limited to the foregoing embodiments, a great many further variations being possible without departing from the gist of the present invention. All such modifications and variations are intended to be included herein within the scope of this disclosure and the present invention and protected by the following claims.

EXPLANATION OF REFERENCE NUMERALS

1 Conveyor belt
1a Loop belt
2 Side end
3 Electrically conductive filament yarn
4 Filament yarn
5a Monofilament yarn
5b Multifilament yarn
6 Weft yarn
7 Warp yarn
7a Warp yarn (making up low-density weave pattern)
7b Warp yarn (making up high-density weave pattern)

7c Flexible stretch yarn
8 Weave pattern
8a Low-density weave pattern
8b High-density weave pattern
9 Plain weave
9a Width
10 Twill weave
10a Width
11 Satin weave
11a Width
12 (Recessed) groove
13 (Projecting) ridge
14 Step
15 Pitch
16 Mesh
16a Gap
17 Striped woven fabric
17a Stripe
18 Object to be conveyed
19 Foam
20 Vibration testing apparatus
21 Vibration source
22 Pickup sensor
23 Angle bar
24 Object
25 Mounting fixture
26 Air fan
27 Conveyor apparatus
28 Belt pulley
28a Projecting region
28b Recessed region
29 Rubber belt
29a Through-hole

What is claimed is:

1. A conveyor belt comprising woven fabric having at least one weft yarn and at least one warp yarn;
   the at least one weft yarn being in a direction perpendicular to a conveying direction of the belt and being formed from a single weft yarn type;
   the at least one warp yarn being in the conveying direction of the belt and being formed from at least two warp yarn types;
   the at least two warp yarn types including a first warp yarn type which makes up a low-density weave pattern and a second warp yarn type which makes up a high-density weave pattern;
   wherein a low-density region and a high-density region are formed in alternating fashion in the width direction of the belt from this one type of weft yarn and these two types of warp yarn;
   the low-density region is formed from a lattice-like mesh having a pattern made in at least one species selected from among the group consisting of plain weave and twill weave;
   the high-density region is formed from a pattern made in satin weave;
   the respective regions are of prescribed widths and form a woven fabric comprising stripes;
   at least a portion of the high-density region is arranged at a belt side end; and
   the conveyor belt is an endless belt.

2. A conveyor belt according to claim 1 wherein,
   in the low-density region, the at least one weft yarn comprises monofilament yarn;
   in the low-density region, the at least one warp yarn comprises monofilament yarn;
   the at least one warp yarn is sparse in the low-density region;
   the at least one warp yarn is crowded in the high-density region;
   the width of the low-density region and the width of the high-density region are respectively such as to permit formation of gaps causing an air permeability thereof to be suitable for suction of air therethrough.

3. A conveyor belt according to claim 1 wherein
   in the low-density region, the at least one warp yarn is woven at low density;
   in the low-density region, the at least one weft yarn comprises monofilament yarn;
   in the low-density region, the at least one warp yarn comprises soft-twist multifilament yarn;
   the soft-twist multifilament yarn is constituted so that it will spread out when woven together with the at least one weft yarn that comprises monofilament yarn; and
   the low-density multifilament warp yarn permits formation of gaps causing air permeability suitable for suction of air therethrough.

4. A conveyor belt according to claim 2 wherein
   a thickness of the low-density region is less than a thickness of the high-density region; and
   this difference in the thickness of the low-density region and the thickness of the high-density region causes a step to be formed therebetween.

5. A conveyor belt according to claim 4 wherein
   the at least one warp yarn is woven at low density in the low-density region;
   the at least one warp yarn is woven at high density in the high-density region;
   the at least one warp yarn which is woven at low density in the low-density region and the at least one warp yarn which is woven at high density in the high density region comprise flexible stretch yarn; and
   the flexible stretch yarn causes the striped woven fabric to have flexibility in a direction of the stripes.

6. A conveyor belt according to claim 5 wherein
   the at least one warp yarn contains electrically conductive filament yarn at at least one of where the at least one warp yarn is woven at low density in the low-density region and where the at least one warp yarn is woven at high density in the high-density region; and
   application of a voltage to this electrically conductive filament yarn causes formation of an electric field which makes it possible to cause a conveyed object to be electrostatically held to the conveyor belt.

7. A conveyor belt according to claim 6 wherein the woven fabric is woven by a needle loom or a shuttle loom.

8. A conveyor belt according to claim 6 wherein
   the woven fabric comprises monofilament yarn and/or multifilament yarn;
   the monofilament yarn and/or the multifilament yarn contains at least one species selected from among the group consisting of metal fiber, natural fiber, artificial fiber, and synthetic fiber; and
   to adjust a gripping force of the conveyor belt and prevent lateral displacement of the at least one warp yarn in a direction of the at least one weft yarn, in correspondence to content of the electrically conductive filament yarn, a coating agent and/or a backing agent formulated to have suitable electrical resistivity is used to carry out coating treatment and/or backing treatment at at least one location where the at least one warp yarn contains the electrically conductive filament yarn.

9. A conveyor apparatus comprising:
a conveyor belt according to claim 1; and
at least one belt pulley on which said conveyor belt is suspended;
wherein the striped woven fabric of the conveyor belt has gaps causing an air permeability thereof to permit suction of air therethrough as suitable for conveying paper and sheet-like objects or objects of diameter smaller than the belt width which are placed thereon and drawn by suction thereto.

10. A conveyor apparatus according to claim 9 wherein
the conveyor belt has a step between the low-density region and the high-density region;
at least a portion of the high-density region is arranged at a side end of the conveyor belt; and
the conveyor belt has at least one feature for preventing lateral displacement and meandering of the conveyor belt.

* * * * *